United States Patent
Futakuchi et al.

(10) Patent No.: US 8,854,939 B2
(45) Date of Patent: Oct. 7, 2014

(54) OPTICAL INFORMATION APPARATUS AND GAP CONTROL METHOD THEREOF

(75) Inventors: Ryutaro Futakuchi, Osaka (JP); Shigeru Furumiya, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/005,386

(22) PCT Filed: Mar. 16, 2012

(86) PCT No.: PCT/JP2012/001844
§ 371 (c)(1), (2), (4) Date: Sep. 16, 2013

(87) PCT Pub. No.: WO2012/127831
PCT Pub. Date: Sep. 27, 2012

(65) Prior Publication Data
US 2014/0003222 A1 Jan. 2, 2014

(30) Foreign Application Priority Data

Mar. 22, 2011 (JP) .................. 2011-061956

(51) Int. Cl.
| | |
|---|---|
| G11B 7/00 | (2006.01) |
| G11B 7/1263 | (2012.01) |
| G11B 7/1374 | (2012.01) |
| G11B 7/1387 | (2012.01) |
| G11B 7/09 | (2006.01) |
| G11B 7/139 | (2012.01) |
| G11B 7/1372 | (2012.01) |

(52) U.S. Cl.
CPC ............ *G11B 7/1263* (2013.01); *G11B 7/1374* (2013.01); *G11B 7/1387* (2013.01); *G11B 7/0908* (2013.01); *G11B 7/139* (2013.01); *G11B 2007/13727* (2013.01)
USPC .......................................... 369/116

(58) Field of Classification Search
None
See application file for complete search history.

(56) References Cited

U.S. PATENT DOCUMENTS

| | | | |
|---|---|---|---|
| 5,495,463 A | 2/1996 | Akagi et al. | |
| 6,717,896 B1 * | 4/2004 | Imanishi | 369/53.27 |
| 2009/0168633 A1 * | 7/2009 | Ishimoto | 369/112.24 |
| 2009/0180372 A1 * | 7/2009 | Jeong et al. | 369/112.23 |

FOREIGN PATENT DOCUMENTS

| | | | | |
|---|---|---|---|---|
| JP | 6-236576 | 8/1994 | | |
| JP | 2002-319153 | 10/2002 | | |
| JP | 2002-319156 | 10/2002 | | |
| JP | 2002-319160 | 10/2002 | | |
| JP | 2002319160 A | * 10/2002 | | G11B 7/09 |
| JP | 2004-335064 | 11/2004 | | |

OTHER PUBLICATIONS

International Search Report issued Jun. 26, 2012 in International (PCT) Application No. PCT/JP2012/001844.

* cited by examiner

*Primary Examiner* — Brenda Bernardi
(74) *Attorney, Agent, or Firm* — Wenderoth, Lind & Ponack, L.L.P.

(57) ABSTRACT

An optical disk apparatus has: a laser (14) that outputs light; an optical system that includes an SIL (2) for forming a predetermined sized beam spot on an optical disk (1) using the light from the laser; a detector (26) that detects output power of the laser and generates a laser power detection signal; a laser power control circuit (27) that controls the output power of the laser using the laser power detection signal; a detector (10) that detects a gap length between the optical disk and the SIL and generates a gap detection signal; and a gap control circuit (15) that controls the gap length between the optical disk and the SIL using the gap detection signal. The power control circuit has a gain crossover frequency greater than a gain crossover frequency of the gap control circuit.

6 Claims, 8 Drawing Sheets

OPTICAL INFORMATION APPARATUS AND GAP CONTROL METHOD THEREOF

TECHNICAL FIELD

The present invention relates to an optical information apparatus that records and/or reproduces information using an information recording medium and a gap control method thereof, and more particularly to an optical disk apparatus that records and/or reproduces information by maintaining a micro gap between an optical system and an information layer of an optical disk or a cover layer for protecting the information layer (hereafter called "gap" or "gap length") at a constant value, and allowing a light beam to reach the information layer of the optical disk via the gap, and a gap control method thereof.

BACKGROUND ART

An approach to increase the density of an optical disk suggests that an optical disk apparatus using an optical head of which light collection system having a high numerical aperture is configured by a combination of an objective lens and a solid immersion lens (hereafter called "SIL").

In this system (hereafter called "SIL system"), a material having a high refractive index (about 1.8 to 2.0) is used for the SIL and a protective layer of the optical disk, and gap control to maintain the gap length at a constant value is performed. As a result, the gap length between the SIL and the protective layer of the optical disk becomes a micro value of about 25 nm, and the SIL becomes very close to the protective layer of the optical disk. Information is recorded and reproduced by evanescent light, which is an output light from the SIL obtained in this way, and many documents related to this technique have already been disclosed.

For example, Patent Document 1 discloses an example of the gap control described above.

According to this SIL system, a numerical aperture of the light collecting system, including the SIL, is 1.70 to 1.80, which is approximately double the numerical aperture of a Blu-ray® (hereafter called "BD") system, which is 0.85. In this case, if the wavelength of the laser is the same, the spot size of the light beam formed on the surface of the information layer of the optical disk becomes approximately half that of the BD system, which means that the recording capacity per unit area, that is the recording density, can be improved to four times that of the BD system.

Figure 8:
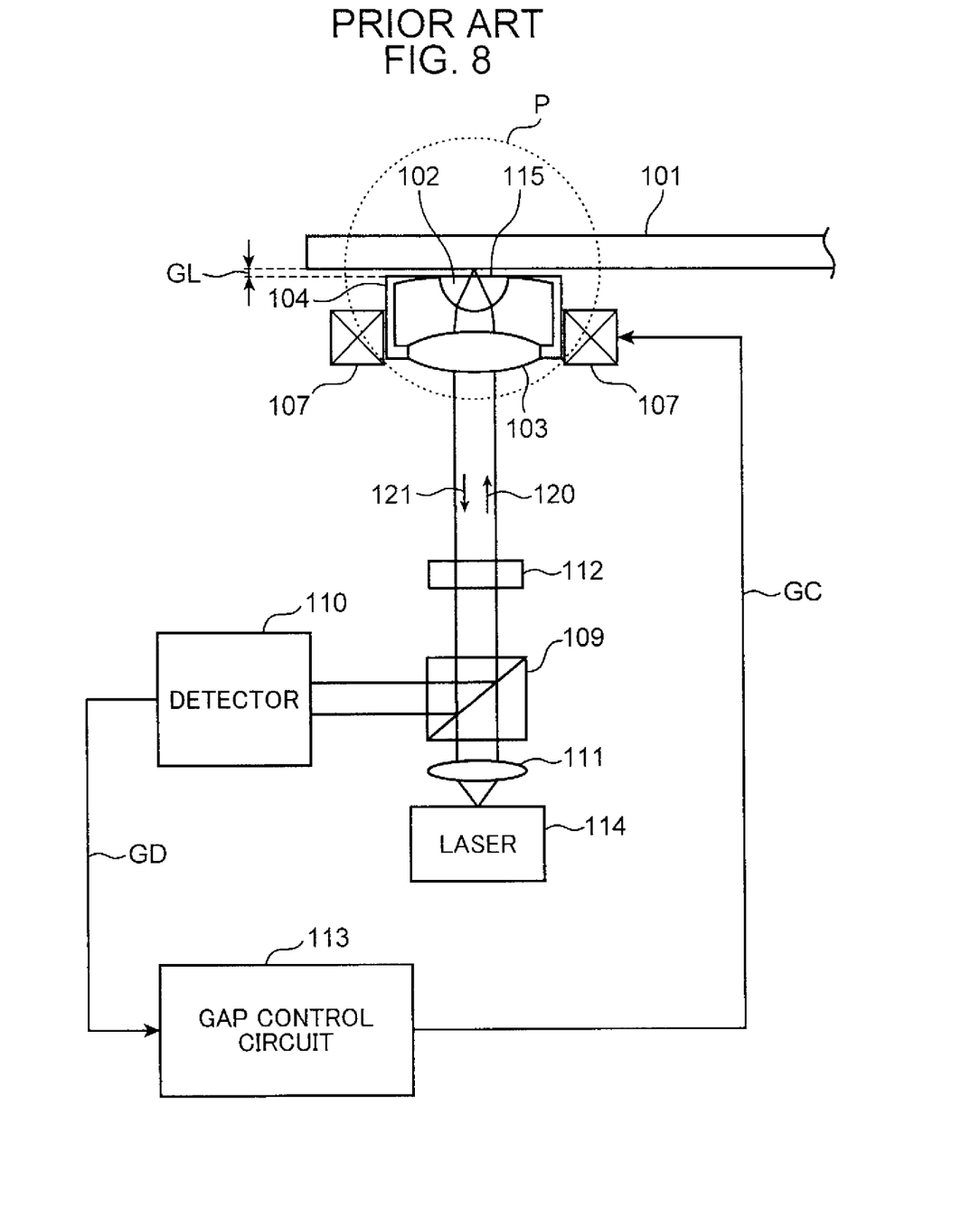
FIG. 8 is a schematic diagram depicting a conventional optical disk apparatus that includes an SIL.
Figure 9:
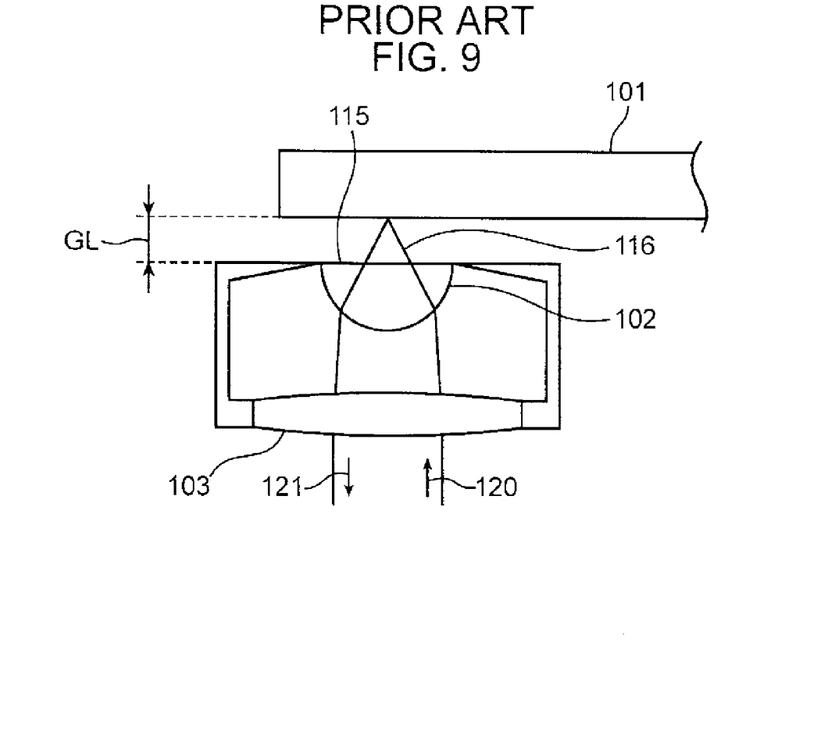
FIG. 9 is an enlarged view of the portion P shown in FIG. 8.

FIG. 8 is a schematic diagram to described this gap control, and depicts a configuration of a conventional optical disk apparatus that includes the SIL, and FIG. 9 is an enlarged view of the portion P circled (broken line) in FIG. 8.

In FIG. 8, 101 denotes an optical disk, 102 denotes an SIL and 103 denotes an objective lens, where the SIL 102 and the objective lens 103 are integrated by a fixture 104. GL denotes a gap length between the optical disk 101 and the SIL 102, and 107 denotes an actuator for gap control.

An output light of a laser 114 to be a light source is transformed into a parallel light by a collimate lens 111, and becomes a light beam (outgoing) 120 via a polarization beam splitter 109. The light beam 120 is irradiated onto the optical disk 101 via a λ/4 plate 112, the objective lens 103 and the SIL 102. In this case, most of the light beam 120 is reflected by a flat surface 115 of the SIL 102, and becomes a light beam (returning) 121, since the numerical aperture of the light collecting system including the SIL 102 is large, 1.70 to 1.80, as mentioned above, and the rest of the light becomes evanescent light 116 and reaches the recording/reproducing surface of the optical disk 101, as shown in FIG. 9.

The light beam 121 reflected on the flat surface 115 of the SIL 102 enters the polarization beam splitter 109 again via the λ/4 plate 112, and enters a detector 110, which is a gap detection unit, by the function of the polarization beam splitter 109. The detector 110 outputs a gap detection signal GD, and a gap control circuit 113 generates a gap control signal GC by appropriately processing the gap detection signal GD, and drives the actuator for gap control 107. Thus gap control is established.

The λ/4 plate 112 is installed because the return light 121 to the laser 114 can be shielded by disposing the polarization beam splitter 109 between the λ/4 plate 112 and the laser 114.

Now the reason why the detector 110 becomes the gap detection unit will be described.

Figure 10:
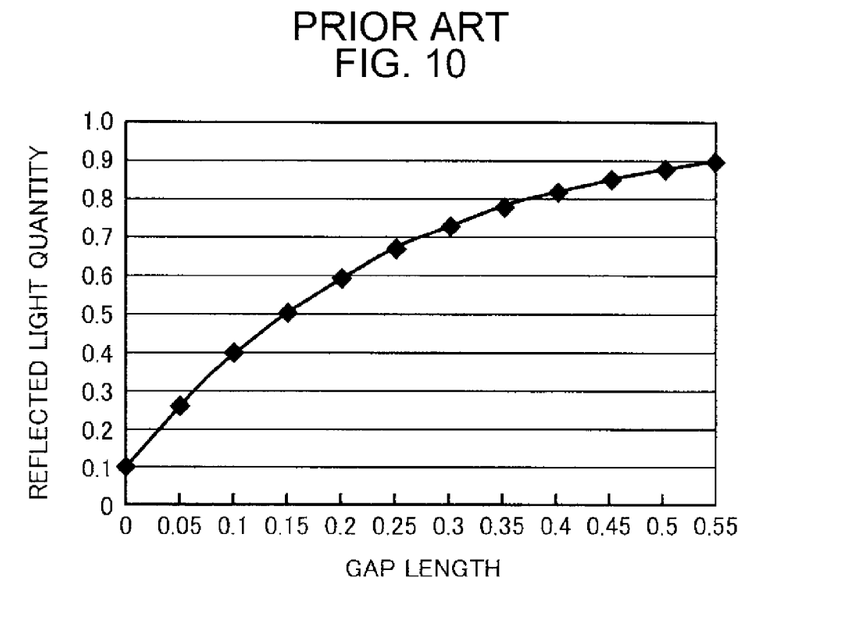
FIG. 10 is a graph showing a relationship between a gap length and reflected light quantity of the flat surface of the SIL when the effective refractive index of the SIL shown in FIG. 8 is 2.1 and the reflectance of the optical disk is 0.1.

FIG. 10 is a graph showing a relationship between a gap length GL and the reflected light quantity on the flat surface 115 of the SIL 102 when the effective refractive index of the SIL 102 shown in FIG. 8 is 2.1, and the reflectance of the optical disk 101 is 0.1, where the reflected light quantity in the ordinate is a value normalized by the reflected light quantity when the gap length GL is infinity, and the gap length in the abscissa is a value normalized by the wavelength of the laser 114.

For example, if the wavelength of the laser 114 is 400 nm, then the value 0.05 of the gap length GL shown in the abscissa in FIG. 10 indicates a gap length of 20 nm as an absolute value.

According to FIG. 10, as the value of the gap length GL changes, the reflected light quantity on the flat surface 115 of the SIL 102 changes, therefore the incident power to the detector 110 shown in FIG. 8 also changes, and the detector 110 can function as the gap detection unit.

In other words, in the gap control of an optical disk apparatus including an optical head which uses the SIL 102 as the light collection system, gap detection is performed based on the characteristics of the reflected light quantity from the flat surface 115 of the SIL 102, which changes depending on the gap length GL, as shown in FIG. 10.

In FIG. 10, the reflected light quantity is 0.1 when the gap length GL is zero, that is, when the flat surface 105 of the SIL 102 is in complete contact with the optical disk 101, because the reflectance of the optical disk 101 is assumed to be 0.1.

However the reflected light quantity from the flat surface 115 of the SIL 102 changes depending not only on the change of the gap length GL, but also on the fluctuation of the power of the light beam 120 outputted from the laser 114 in FIG. 8, that is on the laser power fluctuation. In other words, the fluctuation of power of the light beam 120 may be regarded as the fluctuation of the gap, even if the gap did not actually fluctuate, because of the function of the gap detection unit, and gap control is performed based on this fluctuation, hence stability of gap control is markedly diminished.

In order to prevent the fluctuation of power of the light beam 120 outputted from the laser 114, laser power control is performed on the laser 114.

Figure 11:
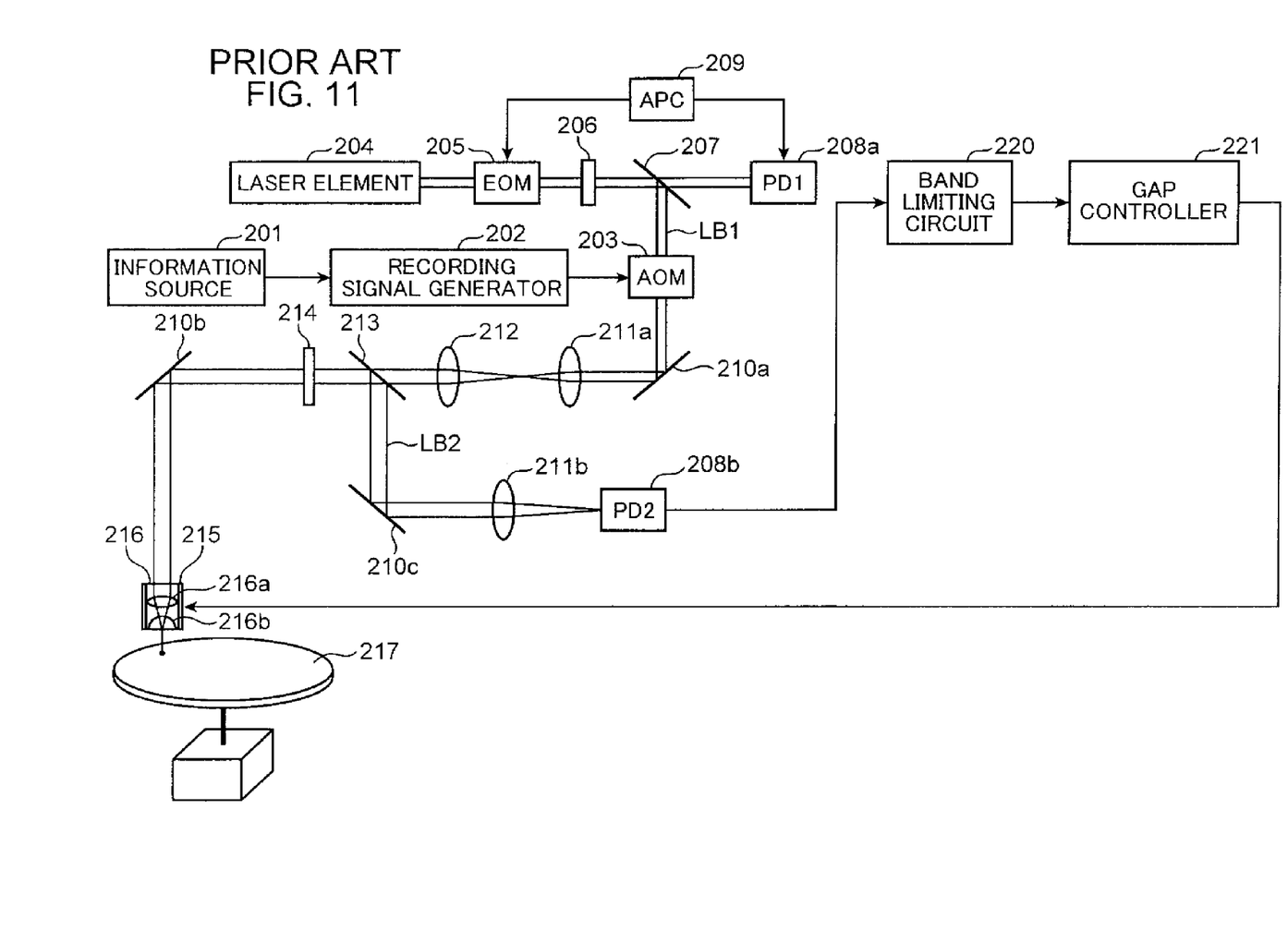
FIG. 11 is a diagram depicting a configuration of a conventional signal recording apparatus that performs gap control including laser power control.

FIG. 11 is a diagram depicting a configuration of a conventional signal recording apparatus which performs gap control including laser power control. The signal recording apparatus shown in FIG. 11 comprises: an information source 201; a recording signal generator 202; an acousto-optical modulator (AOM) 203; a laser element 204 which is a light source to output a laser beam for recording LB1; an electro-optical modulator (EOM) 205; an analyzer 206; a beam splitter (BS) 207; a first photodetector (PD1) 208a; a second photodetector (PD2) 208b; an auto power controller (APC) 209; a first mirror 210a; a second mirror 201b; a third mirror 210c; a first collective lens 211a; a second collective lens 211b; a collimator lens 212; a polarization beam splitter (PBS) 213; a λ/4 plate 214; and an optical head 216 configured by a two-group lens, that is a collective lens 216a and an SIL 216b installed in a piezoelectric element 215.

The signal recording apparatus shown in FIG. 11 also includes: a band limiting circuit 220 that limits the frequency band of return light LB2 from the optical head 216, and outputs return light quantity after the band limitation; and a gap controller 221 that outputs gap control voltage according to the return light quantity after the band limitation outputted from the band limiting circuit 220, so that the distance between the optical head 216 and the glass master disk 217 is controlled to be constant.

In the signal recording apparatus shown in FIG. 11, the laser beam for recording LB1 which entered the first photodetector 208a is converted into an electric signal, and output voltage thereof is inputted into an auto power controller (APC) 209. A difference between this output voltage and a reference voltage is fed back as applied voltage to the EOM 205, whereby the laser power of the laser beam for recording LB1 outputted from the laser element 204 is controlled to be constant.

The composing elements and the functions thereof related to gap control, other than the laser power control described above, are basically the same as the conventional optical disk apparatus shown in FIG. 8, therefore a detailed description here is omitted.

By performing the laser power control shown in FIG. 11, laser power fluctuation of relatively low frequency components due to the temperature characteristics of the laser element 204 can be suppressed, and the negative influence of this power function, that is reflected light quantity fluctuation on the stability of gap control, can be eliminated.

However laser power fluctuation of frequency components, other than relatively low components due to temperature characteristics of the laser element 204, cannot be suppressed, hence if total reflected light quantity fluctuation, that is not due to fluctuation of the gap, such as laser power fluctuation due to a factor other than the temperature characteristics of the laser element 204, is generated, an unrelated light quantity fluctuation, not due to the fluctuation of the gap, is generated, and gap control becomes unstable.

Patent Document 1: Japanese Patent Application Laid-Open No. 2002-319160

SUMMARY OF THE INVENTION

It is an object of the present invention to provide an optical information apparatus that can stably perform gap control, with reducing unrelated fluctuation not due to fluctuation of the gap.

An optical information apparatus according to an aspect of the present invention is an optical information apparatus that records and/or reproduces information using an information recording medium, comprising: a light source that outputs light; an optical system that forms a predetermined sized beam spot on the information recording medium using the light from the light source; a power detection unit that detects output power of the light source and generates a power detection signal; a power control unit that controls the output power of the light source using the power detection signal; a gap detection unit that detects a gap length between the information recording medium and the optical system, and generates a gap detection signal; and a gap control unit that controls the gap length between the information recording medium and the optical system using the gap detection signal, wherein the power control unit has a gain crossover frequency greater than a gain crossover frequency of the gap control unit.

An optical information apparatus according to another aspect of the present invention is an optical information apparatus that records and/or reproduces information using an information recording medium, comprising: a light source that outputs light; an optical system that forms a predetermined sized beam spot on the information recording medium using the light from the light source; a power detection unit that detects output power of the light source and generates a power detection signal; a power control unit that controls the output power of the light source using the power detection signal; a gap detection unit that detects a gap length between the information recording medium and the optical system, and generates a gap detection signal; a correction unit that generates a corrected gap detection signal by removing, from the gap detection signal, a fluctuation component which is not less than a gain crossover frequency of the power control unit; and a gap control unit that controls the gap length between the information recording medium and the optical system using the corrected gap detection signal.

According to the optical information apparatus, unrelated fluctuation, not due to fluctuation of the gap, can be reduced, and stable gap control can be performed.

BEST MODE FOR CARRYING OUT THE INVENTION

Embodiments of the present invention will now be described with reference to the drawings, using an optical disk apparatus as an example of an optical information apparatus. The optical information apparatus to which the present invention is applied is not limited to the optical disk apparatus described below, but the present invention can be applied to various optical information apparatuses that use an information recording medium having a shape other than a disk.

(Embodiment 1)

Figure 1:
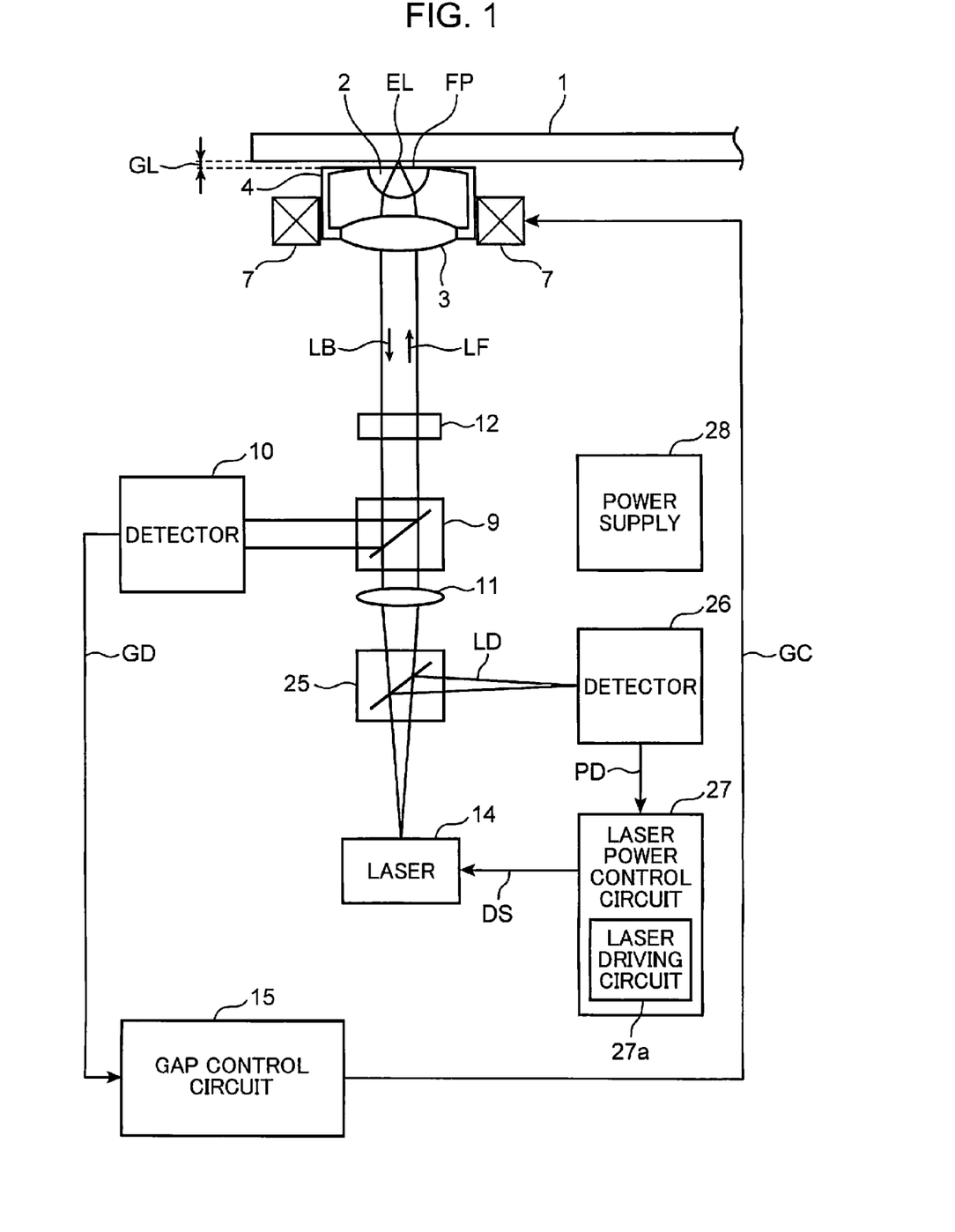
FIG. 1 is a schematic diagram depicting a configuration of an optical disk apparatus according to Embodiment 1 of the present invention.

FIG. 1 is a schematic diagram depicting a configuration of an optical disk apparatus according to Embodiment 1 of the present invention. The optical disk apparatus shown in FIG. 1 has: an SIL 2; an objective lens 3; a fixture 4 that connects the SIL 2 and the objective lens 3; an actuator for gap control 7; a polarization beam splitter 9; a detector 10; a collimate lens 11; a λ/4 plate 12; a laser 14; a gap control circuit 15; a beam splitter 25; a detector 26; a laser power control circuit 27 and a power supply 28. The laser power control circuit 27 has a laser driving circuit 27a that drives the laser 14.

The power supply 28 supplies power to each composing element inside the apparatus, such as the laser 14, the detector 26 and the laser power control circuit 27, and a switching power supply, for example, can be used for the power supply 28. For the actuator for gap control 7, various types of actuators, such as a moving coil type, can be used. The gap length GL in the drawings indicates a distance between the surface of the optical disk 1, which is an example of the information recording medium, and a flat surface EL of the SIL 2.

In this embodiment, the laser 14 corresponds to an example of the light source, the SIL 2 and the objective lens 3 correspond to an example of the optical system, the detector 26 corresponds to an example of the power detection unit, the laser power control circuit 27 corresponds to an example of the power control unit, the detector 10 corresponds to an example of the gap detection unit, the gap control circuit 15 corresponds to an example of the gap control unit, and the power supply 28 corresponds to an example of the power supply.

The laser 14 outputs a laser beam, and the output light of the laser 14 enters the beam splitter 25. The beam splitter 25 splits the light beam outputted from the laser 14, and a light beam LD, which is a part of the split light, enters the detector 26, and the reset of the light beam largely enters the collimate lens 11.

The detector 26 functions as the power detection unit that detects the output power of the laser 14, and generates a laser power detection signal PD, and performs photoelectric conversion on the split light beam LD, and outputs a laser power detection signal PD to the laser power control circuit 27. The laser power control circuit 27 appropriately processes the laser power detection signal PD and outputs the laser power driving signal (driving current) DS to the laser 14 in order to drive the laser 14. As a result, the laser power control for controlling the output power of the laser 14 using the laser power detection signal PD is established.

On the other hand, the collimate lens 11 converts the light beam entered from the beam splitter 25 into parallel light, this parallel light transmits through the polarization beam splitter 9 and the λ/4 plate 12 and becomes a light beam (outgoing) LF, and the light beam LF transmits through the objective lens 3 and the SIL 2 and is irradiated onto the optical disk 1. A light collecting unit is configured by the SIL 2 and the objective lens 3 and collects the output light of the laser 14 to form a predetermined sized beam spot on the optical disk 1, and an optical system is configured by the light collecting unit and the collimate lens 11 and forms a predetermined sized beam spot on the optical disk 1 using the output light from the laser 14.

In this embodiment, the numerical aperture of the light collecting unit, including the SIL 2, is large, that is 1.70 to 1.80, therefore most of the light beam LF is reflected by the flat surface FP of the SIL 2 and becomes the light beam (returning) LB, and the rest of the light beam LF becomes evanescent light EL and reaches the recording/reproducing surface (not illustrated) of the optical disk 1.

The light beam LB reflected by the flat surface FP of the SIL 2, on the other hand, enters the polarization beam splitter 9 via the λ/4 plate 12 again, is reflected by the polarization beam splitter 9 and enters the detector 10. The detector 10 functions as a gap detection unit that detects a gap length between the optical disk 1 and the optical system (flat surface FP of the SIL 2) and generates a gap detection signal GD. The detector 10 generates the gap detection signal GD by performing photoelectric conversion on the entered light beam, and outputs the gap detection signal GD to the gap control circuit 15.

The gap control circuit 15 generates the gap control signal GC by appropriately processing the gap detection signal GD, and outputs the gap control signal GC to the actuator for gap control 7. The actuator for gap control 7 is driven according to the gap control signal GC. As a result, the gap control, to control the gap length between the optical disk 1 and the optical system (flat surface FP of the SIL 2) using the gap detection signal GD, is established.

After keen examination on the laser power fluctuation, which is a problem to perform laser power control, the present inventors discovered that the influence of the switching noise of the power supply 28 is dominant as a laser power fluctuation having a relatively high frequency component, which is different from a relatively lower frequency component due to the temperature characteristic of the laser 14. This aspect will be described in detail hereinbelow.

According to the examination by the present inventors, a gain crossover frequency of the laser power control can be set to about 1 kHz for the laser power fluctuation of the relatively low frequency component due to the temperature characteristic of the laser mentioned above, then gain becomes about 80 dB in the laser power control in a low frequency range around DC, and a fluctuation suppression effect that is sufficient for the laser power fluctuation near this frequency can be implemented. Therefore fluctuation of the reflected light quantity, not due to fluctuation of the gap, can also be suppressed sufficiently, and does not become a causal factor to make gap control unstable.

Furthermore, according to the examination by the present inventors, the control band of the gap control, that is a gain crossover frequency of the gap control, is preferably about 10 kHz, since sufficient capability to track micro bumps on the surface of the optical disk 1 must be implemented even during high-speed rotation.

Figure 2:
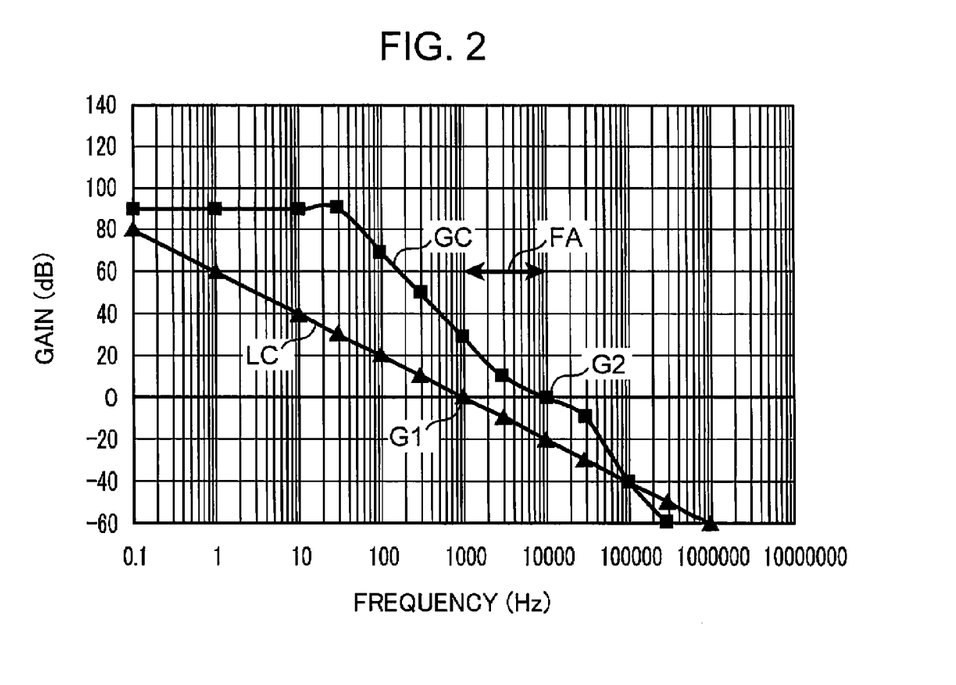
FIG. 2 is a graph showing a control characteristic of a comparison example, where the gain crossover frequency of the laser power control is 1 kHz and the gain crossover frequency of the gap control is 10 kHz.

FIG. 2 is a graph showing a control characteristic of a comparison example examined by the present inventors when the gain crossover frequency of the laser power control is 1 kHz, and the gain crossover frequency of the gap control is 10 kHz. In FIG. 2, LC denotes the control characteristic of the laser power control, G1 denotes the gain crossover frequency 1 kHz thereof, GC denotes the control characteristic of the gap control, and G2 denotes the gain crossover frequency 10 kHz thereof.

Figure 7:
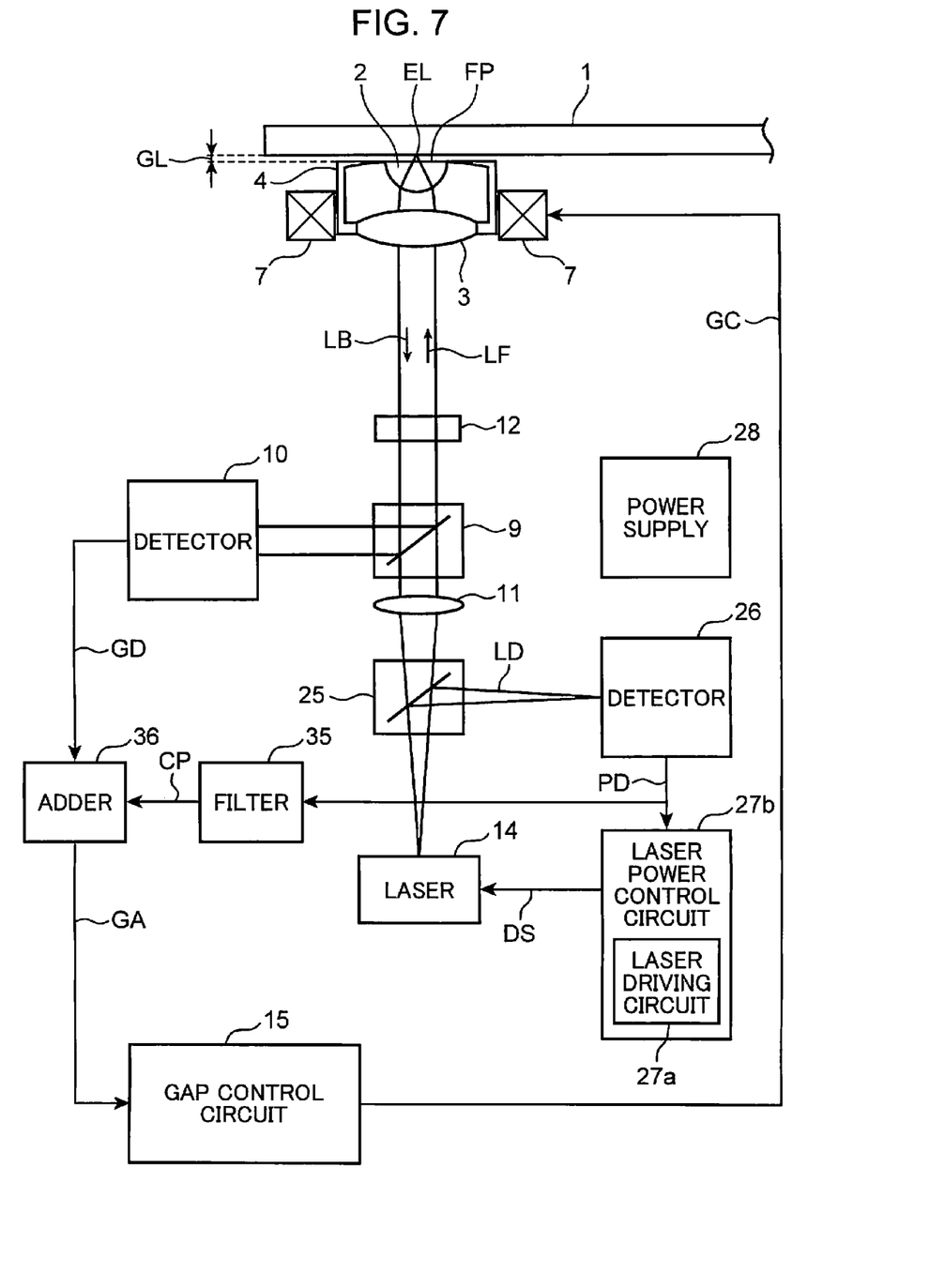
FIG. 7 is a schematic diagram depicting a configuration of an optical disk apparatus according to Embodiment 3 of the present invention.

The laser power control characteristic shown in FIG. 2 can be appropriately determined considering each characteristic of the detector 26, the laser power control circuit 27 and the laser 14 shown in FIG. 1 respectively, and the gap control characteristic can be appropriately determined considering each characteristic of the detector 10, the gap control circuit 15, the actuator for gap control 7, and the gap-total reflected quantity characteristic shown in FIG. 7.

Now it is assumed that there is a factor causing laser power fluctuation, and the frequency component thereof is higher than the gain crossover frequency G1 (1 kHz) of the laser power control characteristic and lower than the gain crossover frequency G2 (10 kHz) of the gap control characteristic, that is the frequency component is in the frequency range FA shown in FIG. 2. In this case, the effect of suppressing laser power fluctuation having a frequency component in the frequency region FA cannot be demonstrated by the laser power control since the gain crossover frequency G1 of the laser power control characteristic is 1 kHz. As a result, the laser power fluctuation having the frequency component in the frequency region FA becomes a laser power fluctuation in the gap control band, and the laser power fluctuation becomes a fluctuation of the reflected light quantity, therefore as mentioned above, the gap control is performed regarding the fluctuation of the reflected light quantity, which is not due to the fluctuation of the gap, as the fluctuation of the gap, which makes gap control unstable.

Now the laser power fluctuation having a frequency component in the frequency range FA shown in FIG. 2 will be described in detail along with the causal factors thereof.

As a result of keen examination on the laser power fluctuation, the present inventors acquired new knowledge that one causal factor of laser power fluctuation which makes gap control unstable is the voltage fluctuation of the power supply used for laser power control, and the laser power fluctuation is generated as a result of this voltage fluctuation that acts on the laser driving circuit and affects the driving current of the laser.

Figure 3:
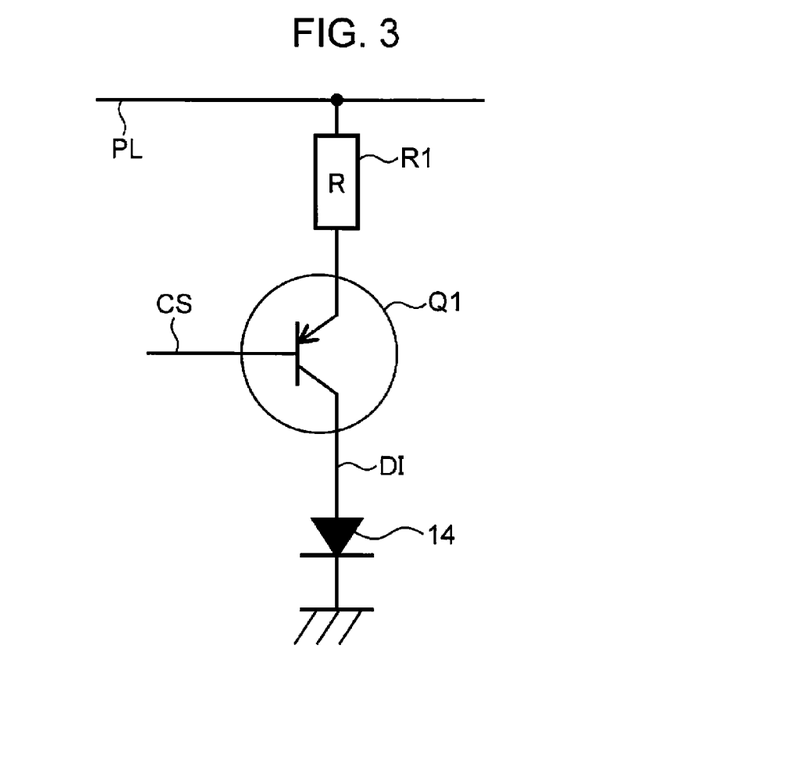
FIG. 3 is a circuit diagram depicting a configuration of an example of the laser driving circuit shown in FIG. 1.

FIG. 3 is a circuit diagram depicting an example of a configuration of the laser driving circuit 27a shown in FIG. 3. The laser driving circuit shown in FIG. 3 has a resistor R1 having a predetermined resistance value R and a transistor Q1. One end of the resistor R1 is connected to a power supply line PL having a power supply voltage V which is supplied from the power supply 28, and the other end is connected to the emitter of the transistor Q1. The base of the transistor Q1 receives a laser control signal CS which is generated by appropriately processing the laser power detection signal PD in the laser power control circuit 27, and the collector of the transistor Q1 is connected to the laser 14, and the transistor Q1 outputs driving current DI according to the laser control signal CS as the laser power driving signal DS to drive the laser 14.

In the laser driving circuit shown in FIG. 3, the current Ir that flows through the resistor R1, where the level of the laser control signal CS is v, is given by the following Expression (1), and the current Ir is equal to the driving current DI of the laser 14. Here Vbe denotes a base-emitter voltage of the transistor Q1.

$$Ir = \{V - (v + Vbe)\}/R \tag{1}$$

Therefore if the power supply voltage V supplied from the power supply line PL contains the fluctuation amount $\Delta V$ therefore and becomes $V + \Delta V$, the current Ir in Expression (1), that is the driving current DI of the laser 14, receives the influence of the fluctuation amount $\Delta V$ of the power supply voltage V, and as a result, the laser power fluctuation is generated.

If a general switching power supply is used for the power supply 28, an example of the fluctuation amount thereof is a fluctuation amount due to the switching noise, and $\Delta V/V$, which is a ratio of the power supply voltage V and the fluctuation amount $\Delta V$ due to switching noise, is about 0.8%, and the switching frequency is several kHz.

This means that the frequency component of $\Delta V$ exists in the frequency range FA in FIG. 2, and the effect of suppressing the laser power fluctuation due to $\Delta V$ cannot be demonstrated by the laser power control, as mentioned above. As a result, the fluctuation amount $\Delta V$ of the power supply voltage V becomes the laser power fluctuation in the gap control band, and the reflected light quantity that enters the detector 10 also fluctuates due to the power fluctuation.

The ultimate influence of the fluctuation amount $\Delta V$ due to the switching noise on the gap fluctuation will be evaluated next.

The fluctuation $\Delta Ir$ of the driving current DI of the laser 14 due to the fluctuation amount $\Delta V$ of the switching noise is given by the following Expression (2) based on Expression (1).

$$\Delta Ir = (dIr/dV) \cdot \Delta V = (1/R) \cdot \Delta V \tag{2}$$

According to the examination by the present inventors, $\Delta V/V$ is 0.8% when the power supply voltage V is 5 V, as mentioned above, so the value of the fluctuation amount $\Delta V$ due to the switching noise is 0.04 V. Therefore if the resistance value R of the resistor R1 shown in FIG. 3 is $1000\Omega$, the fluctuation $\Delta Ir$ of the laser driving current 130 due to $\Delta V$ becomes $4 \times 10^{-5}$ ampere (A) based on Expression (2).

The output power Pw of the laser 14, when the driving current–output power sensitivity of the laser 14 is 1.5 W/A, and the threshold current of the laser 14 is 0.13 A, is given by the following Expression (3). Ir in Expression (3) is the driving current DI of the laser 14 expressed by Expression (1).

$$Pw = 1.5 \, Ir - 0.195 \tag{3}$$

Therefore based on Expression (3), the fluctuation $\Delta Pw$ of Pw due to the fluctuation $\Delta Ir$ of Ir is given by the following Expression (4), and $\Delta Pw$ becomes $6 \times 10^{-5}$ W, and if Pw is 0.0035 W, then the fluctuation ratio $\Delta Pw/Pw$ of the output power of the laser 14 becomes approximately 0.017 (approximately 1.7%).

$$\Delta Pw = (dPw/dIr) \cdot \Delta Ir = 1.5 \cdot \Delta Ir \tag{4}$$

The value of Pw, 0.0035 W, is a value based on the examination by the present inventors, and is an output power of the laser 14 to acquire an optimum gap detection signal GD for gap control in the optical disk apparatus having the control characteristic shown in FIG. 2, considering the transfer efficiency of optical elements which the light beam LF outputted from the laser 14 or the light beam LB reflected by the flat surface FP of the SIL 2 transmits through, such as the polarization beam splitter 9 and the λ/4 plate 12.

Figure 4:
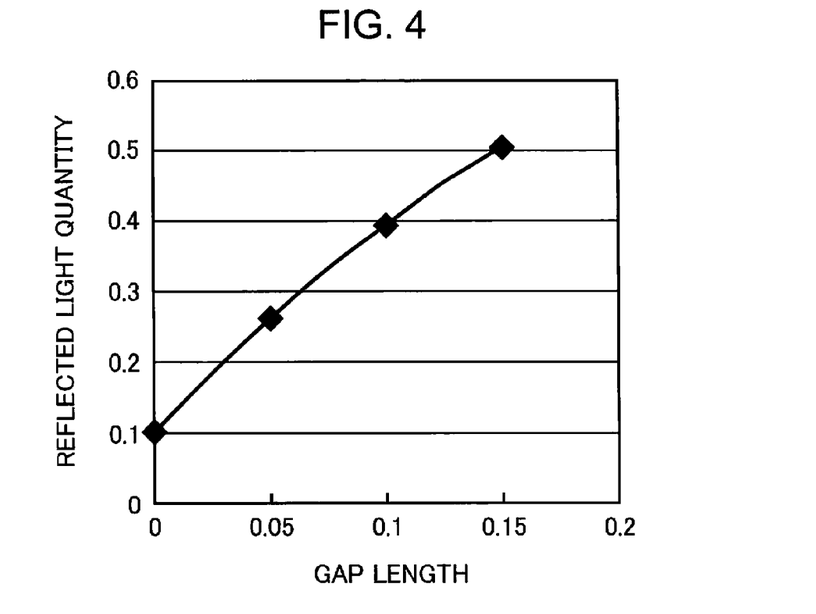
FIG. 4 is a graph showing a relationship of a gap length and reflected light quantity in a region where the gap length is short, out of the relationship of the gap length and the reflected light quantity on the flat surface of the SIL.

FIG. 4 is similar to the relationship between the gap length (abscissa) and the reflected light quantity on the flat surface 115 of the SIL 102 (ordinate) shown in FIG. 7, but more specifically shows the relationship between the gap length (abscissa) and the reflected light quantity (ordinate) in a range where the gap length is short. According to FIG. 4, the change of the reflected light quantity with respect to the gap length can be approximated to a line in the range where the gap length is short, and the relationship between the gap length and the reflected light quantity in this case is given by the following Expression (5). In Expression (5), G denotes a gap length, and P denotes a reflected light quantity.

$$P = 3.2 \, G + 0.1 \tag{5}$$

Based on Expression (5), the fluctuation amount $\Delta P$ when the reflected light quantity P fluctuates, and the fluctuation amount $\Delta G$ of the gap G which causes the fluctuation amount $\Delta P$ is given by the following Expression (6).

$$\Delta G = (1/3.2) \cdot \Delta P \tag{6}$$

If the value of ΔPw/Pw, which is the fluctuation ratio of the output power of the laser 14 described above, is approximately 0.017 (approximately 1.7%), the value of ΔPw/Pw becomes the value of ΔP itself in Expression (6), hence the fluctuation amount ΔG of the gap G is estimated to be approximately 0.53% according to Expression (6).

As described above, the fluctuation amount ΔP (approximately 1.7%) of the reflected light quantity is due to the fluctuation amount ΔV of the power supply voltage V of the power supply line PL shown in FIG. 3, and is not due to the actual fluctuation of the gap. Furthermore as described above, the frequency component of the fluctuation amount ΔV of the power supply voltage V is in the frequency range FA shown in FIG. 2, which means that the frequency component of the fluctuation of the reflected light quantity (approximately 1.7%) is also in the frequency region FA.

Since the frequency range FA is within the control band of the gap control, gap, which is not actually fluctuating, is regarded as fluctuating in the gap control, and irregular functioning of gap fluctuation, in a direction away from the target value of the gap control, is generated. The fluctuation amount in this case is equal to the value of ΔG (approximately 0.53%) which is the fluctuation amount of the gap G determined by Expression (6) mentioned above.

The above is the evaluation of the ultimate influence of the fluctuation amount ΔV due to the switching noise of the power supply 28 on the gap fluctuation, and according to the examination by the present inventors, the accuracy demanded for gap control is as follows. That is, in order to irradiate the energy of the light beam onto the information surface of the optical disk 1 appropriately during recording, or in order to maintain consistency of the quality of the reproduction signal during reproduction, a permissible gap fluctuation amount is about 0.1 nm if the gap length is set to 25 nm, which is 0.4% of the target value of 25 nm gap control.

Therefore the above described gap fluctuation that is approximately 0.53% exceeds the permissible value 0.4%, and does not represent a good condition for recording/reproducing of an optical disk based on the SIL system.

In the above description, the causal factor to make gap control unstable is the fluctuation of the power supply voltage due to the switching noise of the power supply 28, but normally it is difficult to remove the switching noise of the power supply 28, and there is an enormous cost increase if switching noise is removed by improving circuits (e.g. installing a filter).

If the switching frequency of the power supply 28 (that is, the frequency of fluctuation of the power supply voltage due to the switching noise) is higher than the gain crossover frequency G2 of the control characteristic GC of the gap control shown in FIG. 2, the frequency component of reflected light quantity fluctuation due to the fluctuation of the power supply voltage also deviates from the control band of the gap control. In this case, in the gap control described above, a gap which is not actually fluctuating is not regarded as fluctuating, and the gap fluctuation does not depart from the target value of the gap control.

However generally speaking, increasing the switching frequency of the power supply results in an increase in the cost of the power supply itself, which means that the cost of the entire optical disk apparatus increases.

In the above description, the causal factor to make gap control unstable is the fluctuation of the power supply voltage due to the switching noise of the power supply 28, but the fluctuation of the power supply voltage may be generated not only due to the switching noise, but also due to the influence of the current that flows through circuits (not illustrated) other than the gap control circuit, constituting the optical disk apparatus, and it is quite possible that the frequency component of the fluctuation of the power supply voltage due to the influence of this current is in the frequency range FA shown in FIG. 2.

It is possible to suppress such fluctuation of the power supply voltage by improving the circuits, (e.g. installing a filter), but as in the case of removing the switching noise of the power supply 28 mentioned above, an enormous cost increase must be taken into account.

As described above, the fluctuation of the power supply voltage of the power supply 28 causes fluctuation of the reflected light quantity, which is not due to fluctuation of the gap, and if the frequency component of the fluctuation of the power supply voltage is within the control band of the gap control, the frequency component becomes a causal factor of irregular functioning of the gap control, and if there is an attempt to suppress the fluctuation of the power supply voltage by improving the power supply itself or by improving the circuits constituting the optical disk apparatus, cost increases enormously.

Figure 5:
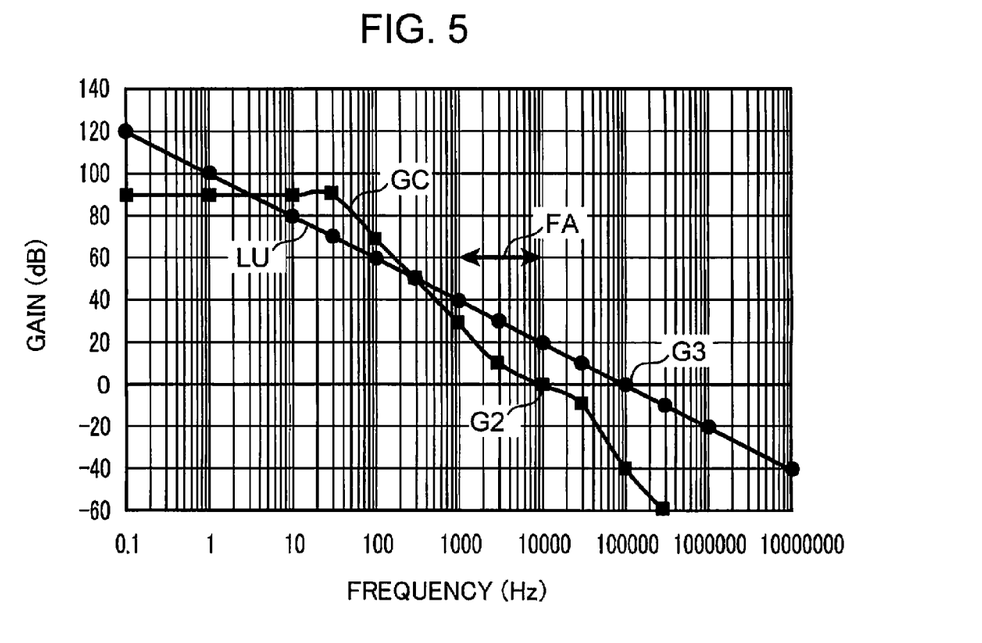
FIG. 5 is a graph showing control characteristics of the laser power control and the gap control of the optical disk apparatus in FIG. 1.

Based on this finding, the present embodiment improves the control characteristics of the laser power control by the laser power control circuit 27, and suppresses the laser power fluctuation having a frequency component in the 1 kHz to 10 kHz range, for example, other than a relatively low frequency component due to the temperature characteristic of the laser 14. FIG. 5 is a graph showing the control characteristics of the laser power control and the gap control of the optical disk apparatus shown in FIG. 1.

As FIG. 5 shows, the control characteristic GC of the gap control is a control characteristic of the gap control circuit 15, and in this embodiment, the control band of the gap control, that is the gain crossover frequency G2 of the gap control circuit 15, is set to 10 kHz, which is a desirable gain crossover frequency to implement sufficient tracking capability for micro bumps on the surface of the optical disk 1 even during high-speed rotation.

The control characteristic LU of the laser power control is the control characteristic of the laser power control circuit 27, and according to this embodiment, the control band of the laser power control, that is the gain crossover frequency G3 of the laser power control circuit 27, is set to 100 kHz. Thus according to this embodiment, the gain crossover frequency G3 of the laser power control circuit 27 is set to 100 kHz, which is 10 times the gain crossover frequency G2 (10 kHz) of the gap control circuit 15.

If the gap control and the laser power control are set to have the characteristics shown in FIG. 2, as described above, the fluctuation of the power supply voltage V of the power supply 28, which becomes a causal factor of the laser power fluctuation, can be suppressed. In concrete terms, if the switching frequency is several kHz when the power supply 28 is the switching power supply, then the frequency component of the switching noise ΔV becomes several kHz, and this frequency becomes sufficiently lower than the gain crossover frequency G2 (100 kHz) of the laser power control characteristic LU according to this embodiment. In other words, the laser power control circuit 27 has a gain crossover frequency that is higher than the frequency of the noise from the power supply 28.

Therefore according to this embodiment, the fluctuation suppression effect of the laser power control can be implemented for the power fluctuation due to the switching noise ΔV. For example, even if the frequency component (several kHz) of the switching noise ΔV is within the frequency range FA, and the power fluctuation due to the switching noise ΔV is approximately 1.7%, this power fluctuation can be suppressed from approximately 0.17% to approximately 0.017% since the gain of the laser power control is 20 dB to 40 dB, and the fluctuation of the reflected light quantity can be reduced from approximately 0.17% to approximately 0.017%.

The fluctuation $\Delta P$ of the reflected light quantity can be reduced from approximately 0.17% to approximately 0.017% according to this embodiment, therefore if the fluctuation amount $\Delta G$ of the graph length corresponding to the fluctuation $\Delta P$ of the reflected light quantity is determined using Expression (6), the fluctuation amount $\Delta G$ of the gap length becomes approximately 0.005% from approximately 0.05%, which means that the fluctuation of the gap length can be suppressed to $\frac{1}{10}$.

The fluctuation of the reflected light quantity (from approximately 0.05% to approximately 0.005%) is due to the fluctuation amount $\Delta V$ of the power supply voltage V of the power supply line PL shown in FIG. 3, and not due to actual gap fluctuation, therefore the frequency component of the fluctuation amount $\Delta V$ of the power supply voltage V is in the frequency range FA shown in FIG. 5, and the frequency component of the fluctuation of the reflected light quantity, that becomes approximately 0.005% from approximately 0.05%, is also in the frequency range FA.

Hence as FIG. 5 shows, the gap control circuit 15 regards that the gap is fluctuating even if the gap is not actually fluctuating, since the frequency range FA is within the control band of the gap control, and irregular functioning in a direction away from the target value is generated in the gap control. However according to this embodiment, the gap fluctuation amount generated by the irregular functioning is approximately 0.005% or less of the target value.

While the permissible gap fluctuation is 0.4% to appropriately irradiate the energy of the light beam onto the information surface of the optical disk 1 during recording, or to maintain the constancy of the quality of the reproduction signal during reproduction, the gap fluctuation amount, that is approximately 0.005% or less as mentioned above, is sufficiently small, therefore according to this embodiment, the object of appropriately irradiating the light beam onto the information surface of the optical disk 1 during recording, or maintaining constancy of the quality of the reproduction signal during reproduction can be sufficiently implemented.

As described above, according to the optical disk apparatus of this embodiment, the values of the control band (gain crossover frequency) of the laser power control circuit 27 and the control band (gain crossover frequency) of the gap control circuit 15 are set to have distinct differences, in other words, the former is set to 10 times the latter, whereby the fluctuation of the total reflected light quantity due to power fluctuation in the control band of the gap control (that is a frequency band not more than the gain crossover frequency) can be suppressed to an extremely small value, and as a result, the stable operation of the gap control can be guaranteed.

In this embodiment, the control band (gain crossover frequency) of the laser power control circuit 27 of the optical disk apparatus is 10 times the control band (gain crossover frequency) of the gap control circuit 15, but the present invention is not limited to this example, but can be modified in various ways. For example, in order to suppress the reflected light quantity fluctuation due to power fluctuation in the control band of the gap control (that is a frequency band not more than the gain crossover frequency) and to suppress unstable operation of the gap control, at least the control band (gain crossover frequency) of the laser power control circuit 27 of the optical disk apparatus is set to a value not less than the control band (gain crossover frequency) of the gap control circuit 15. The former may be set to a value greater than 10 times the latter, and in this case, the effect of suppressing the unstable operation of the gap control can be enhanced. This aspect is the same for the other embodiments.

As described above, it is desirable to set the value of the control band (gain crossover frequency) of the laser power control circuit 27 with respect to the control band (gain crossover frequency) of the gap control circuit 15 of the optical disk apparatus of this embodiment, considering the frequency component related to the causation factor of the laser power fluctuation generated in the optical disk apparatus and the value thereof.

(Embodiment 2)

An optical disk apparatus according to Embodiment 2 of the present invention will be described next. This embodiment is an optical disk apparatus that records or reproduces information to/from an optical disk using plasmon light that is generated by irradiating light beam onto a metal chip (recording/reproduction based on the plasmon system).

Figure 6:
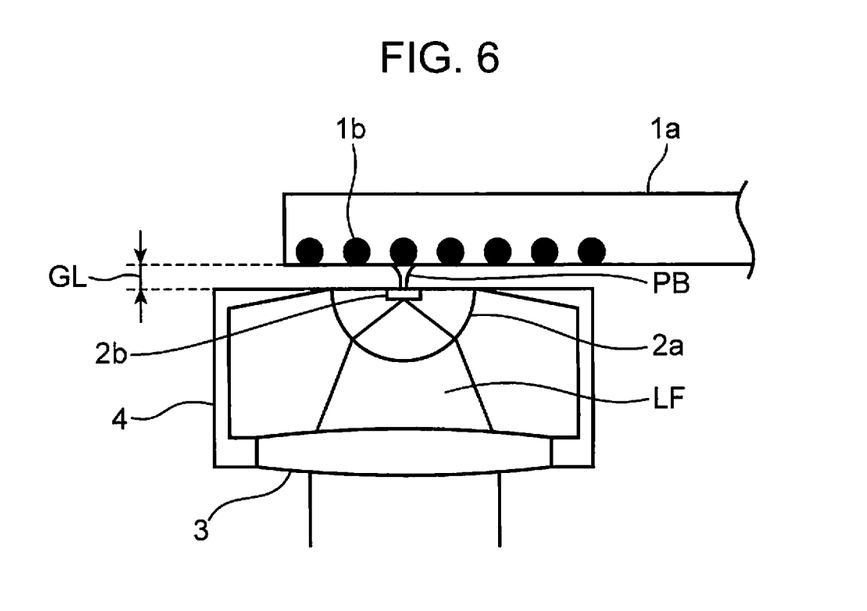
FIG. 6 is a schematic diagram depicting mainly a light collecting unit of an optical disk apparatus according to Embodiment 2 of the present invention.

FIG. 6 is a schematic diagram depicting mainly a light collecting unit of the optical disk apparatus according to Embodiment 2 of the present invention. As FIG. 6 shows, the optical disk apparatus of this embodiment has: an SIL 2a; a metal chip 2b; an objective lens 3; and a fixture 4 that connects the SIL 2a and the objective lens 3. The optical disk 1a includes a plurality of particles 1b, and the particles (several nm to more than a dozen nm) 1b are formed on the surface of the optical disk 1a, unlike the optical disk 1 shown in FIG. 2.

The plasmon system used for this embodiment is a system to generate a plasmon beam PB by irradiating a light beam collected by the objective lens 3 and the SIL 2a onto the metal chip 2b which is integrated with the SIL 2a, and forms recording marks on the particles 1b on the surface of the optical disk 1a. According to this plasmon system, the optical system, which forms a predetermined sized beam spot on the optical disk 1a using an output light from the laser 14, is configured by the metal chip 2b, the SIL 2a and the objective lens 3.

In FIG. 6, composing elements other than the composing elements described above are the same as the composing elements in FIG. 1 depicting the configuration of the optical disk apparatus of Embodiment 1, such as the gap control circuit 15 and the laser power control circuit 27, therefore description of these elements is omitted.

The gap length GL is a gap length between the optical disk 1a and the SIL 2a, and is a micro value around 25 nm, and in the case of the plasmon system used for this embodiment as well, the requirement for this value is about the same as that for the SIL system described in Embodiment 1.

This means that in the plasmon system used for this embodiment as well, the gap control is indispensable, and the relationship between the control band of the gap control and the control band of the laser power control of this embodiment is the same as that of Embodiment 1, which was described with reference to FIG. 5.

In other words, as FIG. 5 shows, the control characteristic GC of the gap control is a control characteristic of the gap control circuit 15, and in this embodiment as well, the control band of the gap control, that is the gain crossover frequency G2 of the gap control circuit 15, is set to 10 kHz, which is a desirable gain crossover frequency to implement sufficient tracking capability for micro bumps on the surface of the optical disk 1a even during high-speed rotation.

In this embodiment as well, the control characteristic LU of the laser power control is the control characteristic of the laser power control circuit 27, and the control band of the laser power control, that is the gain crossover frequency G3 of the laser power control circuit 27, is set to 100 kHz. Thus according to this embodiment as well, the gain crossover frequency G3 of the laser power control circuit 27 is set to 100 kHz, which is 10 times the gain crossover frequency G2 (10 kHz) of the gap control circuit 15.

As mentioned above, in this embodiment as well, the fluctuation of the power supply voltage V of the power supply 28, which becomes a causal factor of the laser power fluctuation, can be suppressed if the gap control and the laser power control are set to have the characteristics shown in FIG. 2. In concrete terms, if the switching frequency is several kHz when the power supply 28 is the switching power supply, then the frequency component of the switching noise ΔV becomes several kHz, and this frequency becomes sufficiently lower than the gain crossover frequency G2 (100 kHz) of the laser power control characteristic LU according to this embodiment. In other words, the laser power control circuit 27 has a gain crossover frequency that is higher than the frequency of the noise from the power supply 28.

Therefore according to this embodiment as well, the fluctuation suppression effect of the laser power control can be demonstrated for the power fluctuation due to the switching noise ΔV. For example, even if the frequency component (several kHz) of the switching noise ΔV is within the frequency range FA, and the power fluctuation due to the switching noise ΔV is approximately 1.7%, this power fluctuation can be suppressed from approximately 0.17% to approximately 0.017% since the gain of the laser power control is 20 dB to 40 dB, and the fluctuation of the reflected light quantity can be reduced from approximately 0.17% to approximately 0.017%.

The fluctuation ΔP of the reflected light quantity can be reduced from approximately 0.17% to approximately 0.017% according to this embodiment as well, therefore the fluctuation amount ΔG of the gap length corresponding to the fluctuation ΔP of the reflected light quantity is determined using Expression (6), and the fluctuation amount ΔG of the gap length becomes approximately 0.005% from approximately 0.05%, which means that the fluctuation of the gap length can be suppressed to ¹⁄₁₀.

The fluctuation of the reflected light quantity (from approximately 0.05% to approximately 0.005%) is due to the fluctuation amount ΔV of the power supply voltage V of the power supply line PL shown in FIG. 3, and not due to actual gap fluctuation, therefore the frequency component of the fluctuation amount ΔV of the power supply voltage V is in the frequency range FA shown in FIG. 5, and the frequency component of the fluctuation of the reflected light quantity, that becomes approximately 0.005% from approximately 0.05%, is also in the frequency range FA.

Hence as FIG. 5 shows, the gap control circuit 15 regards that the gap is fluctuating even if the gap is not actually fluctuating, since the frequency range FA is within the control band of the gap control, and the irregular functioning in a direction away from the target value is generated in the gap control. However according to this embodiment as well, the gap fluctuation amount generated by the irregular functioning is approximately 0.005% or less of the target value.

While the permissible gap fluctuation is 0.4% to appropriately irradiate the energy of the light beam onto the information surface of the optical disk 1 during recording, or to maintain the constancy of the quality of the reproduction signal during reproduction, the gap fluctuation amount, that is approximately 0.005% or less, as mentioned above, is sufficiently small, therefore according to this embodiment as well, the object of appropriately irradiating the light beam onto the information surface of the optical disk during recording, or maintaining constancy of the quality of reproduction signal during reproduction, can be sufficiently achieved.

As described above, according to the optical disk apparatus of this embodiment, the values of the control band (gain crossover frequency) of the laser power control circuit 27 and the control band (gain crossover frequency) of the gap control circuit 15 are set to have distinct differences, in other words, the former is set to 10 times the latter, whereby the fluctuation of total reflected light quantity due to power fluctuation in the control band of the gap control (that is a frequency band not more than the gain crossover frequency) can be suppressed to an extremely small value, and as a result, the stable operation of the gap control can be guaranteed.

Therefore it is desirable to set the value of the control band (gain crossover frequency) of the laser power control circuit 27 with respect to the control band (gain crossover frequency) of the gap control circuit 15 of the optical disk apparatus of this embodiment considering the frequency component related to the causation factor of the laser power fluctuation generated in the optical disk apparatus and the value thereof.

In this embodiment, the optical system which records or reproduces information to/from an optical disk using a plasmon light which is generated by irradiating a light beam onto the metal chip was described as an example, but the present invention is not limited to each example described above, but can be applied to various types of optical information apparatuses that records and/or reproduces information to/from an information recording media using light.

For example, an optical system that generates a plasmon light by irradiating a light beam onto a scatterer (e.g. metal chip) formed on a predetermined substrate may be used without using the SIL. The present invention can also be applied to an optical disk apparatus which uses a near-field light, such as an evanescent light or a plasmon light, for the gap control and/or tracking control, or an optical disk apparatus having an optically-assisted magnetic recording head which heats the information recording medium using a near-field light and records information on the information recording medium using a magnetic field where magnetic poles generate at the same time, and a similar effect can be implemented.

(Embodiment 3)

An optical disk apparatus according to Embodiment 3 of the present invention will be described next. FIG. 7 is a schematic diagram depicting a configuration of the optical disk apparatus according to Embodiment 3 of the present invention. The optical disk apparatus shown in FIG. 7 has: an SIL 2; an objective lens 3; a fixture 4 that connects the SIL 2 and the objective lens 3; an actuator for gap control 7; a polarization beam splitter 9; a detector 10; a collimate lens 11; a λ/4 plate 12; a laser 14 which is an example of a light source; a gap control circuit 15; a beam splitter 25; a detector 26; a laser power control circuit 27b; a power supply 28; a filter 35; and an adder 36.

In this embodiment, the detector 26 corresponds to an example of the power detection unit, the laser power control circuit 27 corresponds to an example of the power control unit, the detector 10 corresponds to an example of the gap detection unit, the gap control circuit 15 corresponds to an example of the gap control unit, the filter 35 and the adder 36 correspond to an example of the correction unit, the filter 35 corresponds to an example of the filter unit, and the adder 36 corresponds to an example of a fluctuation component removal unit, and the rest is the same as Embodiment 1.

The characteristic of this embodiment is: when power fluctuation which cannot be suppressed by the laser power control system is generated, fluctuation of reflected light quantity, not due to actual gap fluctuation, is generated and thereby gap control becomes unstable, and to solve this problem, attention is paid to the offset of the power fluctuation and the fluctuation of the reflected light quantity.

In other words, the difference of the optical disk apparatus shown in FIG. 7 from the optical disk apparatus shown in FIG. 1 is as follows. The detector 26 inputs the laser power detection signal PD not only to the laser power control circuit 27, but also to the filter 35. The filter 35 extracts a power fluctuation component that cannot be suppressed by the laser power control system, such as a component in the frequency band FA shown in FIG. 2, from the laser power detection signal PD, and adjusts the level and phase of this component. For example, the filter 35 inputs a corrected laser power detection signal CP, generated by adjusting the phase of the extracted component to an opposite phase, to the adder 36, so as to cancel this component by the adder 36. The adder 36 adds the corrected laser power detection signal CP to the gap detection signal GD at a predetermined ratio, whereby a signal, generated by removing the power fluctuation component that cannot be suppressed by the laser power control system (laser power control circuit 27*b*) from the gap detection signal GD, is inputted to the gap control circuit 15 as a corrected gap detection signal GA, and the gap control circuit 15 performs gap control using the corrected gap detection signal GA.

The laser power control circuit 27*b*, on the other hand, has a control characteristic LC to control the laser power shown in FIG. 2, and the gain crossover frequency G3 of the laser power control circuit 27*b* is set to 1 kHz. In this case, the laser power control circuit 27*b* having a 100 kHz gain crossover frequency cannot suppress a power fluctuation not less than the gain crossover frequency G3 (1 kHz), but since the gap control circuit 15 performs gap control using the corrected gap detection signal GD generated by removing the power fluctuation component that cannot be suppressed by the laser power control circuit 27*b* from the gap detection signal GD, as mentioned above, the gap control can be performed without being affected by the power fluctuation that cannot be suppressed by the laser power control circuit 27*b*.

As mentioned above, according to this embodiment, the filter 35 shown in FIG. 7 is used, and the filter 35 appropriately adjusts the level and the phase of the power fluctuation component that is included in the laser power detection signal PD and cannot be suppressed by the laser power control system. Then the adder 36 generates a corrected gap detection signal GA by adding the corrected laser power detection signal CP to the gap detection signal GD such that the power fluctuation component that cannot be suppressed by the laser power control system is removed, and the corrected gap detection signal GA generated by removing the power fluctuation component that cannot be suppressed by the laser power control system is inputted to the gap control circuit 15 from the adder 36.

As a result, according to the optical disk apparatus of this embodiment, the power fluctuation that cannot be suppressed by the laser power control system and the reflected light quantity fluctuation are offset, and the gap detection signal generated by removing influence of the power fluctuation from the gap detection signal GD is inputted to the gap control circuit 15 as the corrected gap detection signal GA of the adder 36, therefore stable gap control operation, without being subject to influence of the power fluctuation that cannot be suppressed by the laser power control system, can be guaranteed.

According to this embodiment, the corrected gap detection signal GA is generated by removing influence of the power fluctuation from the gap detection signal GD using the filter 35 and the adder 36, but the present invention is not limited to this example, and numerous modifications can be made.

For example, the same effect can be implemented by using a bandpass filter (or a high-pass filter) and a subtracter, instead of the filter 35 and the adder 36. In concrete terms, the bandpass filter extracts a power fluctuation component that cannot be suppressed by the laser power control system, such as a fluctuation component not less than the gain crossover frequency of the laser power control circuit 27*b*, from the laser power detection filter PD, and outputs this component to the subtracter as the corrected laser power detection signal, and the subtracter subtracts the corrected laser power detection signal from the gap detection signal GD at a predetermined ratio, whereby the corrected gap detection signal is generated by removing the fluctuation component not less than the gain crossover frequency of the laser power control circuit 27*b* from the gap detection signal, and the gap control circuit 15 performs the gap control using this corrected gap detection signal. In this case, the bandpass filter and the subtracter correspond to an example of the correction unit, the bandpass filter corresponds to an example of the filter unit, and the subtracter corresponds to an example of the fluctuation component removing unit.

The control characteristic of the laser power control circuit is not limited to the example described above, but numerous modifications can be made. For example, the laser power control circuit 27 having a 100 kHz gain crossover frequency shown in FIG. 1 may be used instead of the laser power control circuit 27*b*. In concrete terms, the filter 35 extracts the fluctuation component of the output power of the laser 14 from the laser power detection signal PD, and the adder 36 removes the fluctuation component extracted by the filter 35 from the gap detection signal GD, so as to generate the corrected gap detection signal GA by removing the fluctuation component, not due to the fluctuation of the gap between the optical disk 1 and the SIL 2, and the gap control circuit 15 controls the gap length between the optical disk 1 and the SIL 2 using the corrected gap detection signal GA. In this case, a more stable gap control can be implemented.

Each embodiment described above is merely illustrative, and numerous modifications can be made without departing from the spirit and scope of the invention. It is certainly possible to appropriately combine each composing element of the embodiments and the modified composing elements thereof.

As described in each embodiment, each aspect of the present invention can be summarized as follows. An optical information apparatus according to an aspect of the present invention is an optical information apparatus that records and/or reproduces information using an information recording medium, comprising: a light source that outputs light; an optical system that forms a predetermined sized beam spot on the information recording medium using the light from the light source; a power detection unit that detects output power of the light source and generates a power detection signal; a power control unit that controls the output power of the light source using the power detection signal; a gap detection unit that detects a gap length between the information recording medium and the optical system, and generates a gap detection signal; and a gap control unit that controls the gap length between the information recording medium and the optical system using the gap detection signal, wherein the power control unit has a gain crossover frequency greater than a gain crossover frequency of the gap control unit.

According to this optical information apparatus, the power control unit has the gain crossover frequency greater than the gain crossover frequency of the gap control unit, therefore the power control unit can suppress unrelated light quantity fluctuation in the control band of the gap control unit. Since the fluctuation of the gap can be accurately detected with reducing light quantity fluctuation not due to fluctuation of the gap, stable gap control can be performed based on this accurate gap fluctuation information. As a result, even if fluctuation of total reflected light quantity occurs, not due to fluctuation of the gap, in other words, even if laser power fluctuation occurs, unstable gap control operation can be suppressed, therefore stable gap control can be performed with reducing unrelated fluctuation not due to fluctuation of the gap.

Desirably, the power control unit has a gain crossover frequency which is not less than 10 times the gain crossover frequency of the gap control unit.

In this case, the fluctuation of total reflected light quantity due to power fluctuation in the control band of the gap control, that is in a frequency band not more than the gain crossover frequency of the gap control unit, can be suppressed to an extremely small value, therefore stable gap control operation can be guaranteed with precision.

Desirably, the optical information apparatus further comprises a power supply that supplies power to drive the light source, wherein the power control unit has a gain crossover frequency that is higher than the frequency of noise from the power supply.

In this case, the power control unit can suppress the power fluctuation generated due to the noise from the power supply, therefore fluctuation of the gap can be accurately detected with removing influence of unrelated power fluctuation due to the noise from the power supply, and as a result, stable gap control can be performed based on this accurately detected fluctuation of the gap.

Desirably, the optical information apparatus further comprises a correction unit that generates a corrected gap detection signal by removing, from the gap detection signal, a fluctuation component which is not due to fluctuation of the gap between the information recording medium and the optical system, wherein the gap control unit controls the gap length between the information recording medium and the optical system using the corrected gap detection signal.

In this case, the corrected gap detection signal is generated by removing the fluctuation component not due to fluctuation of the gap between the information recording medium and the optical system, and the gap length between the information recording medium and the optical system is controlled using this corrected gap detection signal, therefore stable gap control operation can be guaranteed without receiving the influence of the unrelated fluctuation not due to fluctuation of the gap.

Desirably, the correction unit includes a filter unit that extracts a fluctuation component of the output power of the light source from the power detection signal and a fluctuation component removal unit that generates the corrected gap detection signal by removing, from the gap detection signal, the fluctuation component extracted by the filter unit.

In this case, the fluctuation component of the output power of the light source is extracted from the power detection signal, and the extracted fluctuation component is removed from the gap detection signal, therefore the fluctuation of the gap can be accurately detected without receiving influence of light quantity fluctuation not due to fluctuation of the gap.

An optical information apparatus according to another aspect of the present invention is an optical information apparatus that records and/or reproduces information using an information recording medium, comprising: a light source that outputs light; an optical system that forms a predetermined sized beam spot on the information recording medium using the light from the light source; a power detection unit that detects output power of the light source and generates a power detection signal; a power control unit that controls the output power of the light source using the power detection signal; a gap detection unit that detects a gap length between the information recording medium and the optical system, and generates a gap detection signal; a correction unit that generates a corrected gap detection signal by removing, from the gap detection signal, a fluctuation component which is not less than a gain crossover frequency of the power control unit; and a gap control unit that controls the gap length between the information recording medium and the optical system using the corrected gap detection signal.

According to this optical information apparatus, the corrected gap detection signal is generated by removing the fluctuation component, not less than the gain crossover frequency of the power control unit, from the gap detection signal, and the gap length between the information recording medium and the optical system is controlled using this corrected gap detection signal, therefore fluctuation of the gap can be accurately detected with removing influence of light quantity fluctuation not due to fluctuation of the gap, and stable gap control can be performed based on this accurately detected fluctuation of the gap. As a result, stable gap control operation is guaranteed without receiving influence of the power fluctuation that cannot be suppressed by the power control unit, and stable gap control operation can be performed with reducing the fluctuation not due to fluctuation of the gap.

Desirably, the correction unit includes a filter unit that extracts a fluctuation component, which is not less than the gain crossover frequency of the power control unit, from the power detection signal; and a fluctuation component removal unit that generates the corrected gap detection signal by removing, from the gap detection signal, the fluctuation component extracted by the filter unit.

In this case, the fluctuation component not less than the gain crossover frequency of the power control unit is extracted from the power detection signal, and the extracted fluctuation component is removed from the gap detection signal, therefore the fluctuation of the gap can be accurately detected without receiving influence of the fluctuation component, not less than the gain crossover frequency, that cannot be suppressed by the power control unit.

A gap control method for an optical information apparatus according to another aspect of the present invention is a gap control method for an optical information apparatus that records and/or reproduces information using an information recording medium, comprising: a first step of detecting output power of a light source that outputs light and generating a power detection signal; a second step of controlling the output power of the light source using the power detection signal; a third step of detecting a gap length between the information recording medium and an optical system which forms a predetermined sized beam spot on the information recording medium using the light from the light source, and generating a gap detection signal; and a fourth step of controlling the gap length between the information recording medium and the optical system using the gap detection signal, wherein a gain crossover frequency of the power control in the second step is greater than a gain crossover frequency of the gap control in the fourth step.

According to this gap control method, the gain crossover frequency of the power control is greater than the gain crossover frequency of the gap control, therefore unrelated light quantity fluctuation in the control band of the gap control can be suppressed by the power control. Since the fluctuation of the gap can be accurately detected with reducing light quantity fluctuation not due to fluctuation of the gap, stable gap control can be performed based on this accurate gap fluctuation information. As a result, even if fluctuation of total reflected light quantity occurs, not due to fluctuation of the gap, in other words, even if the laser power fluctuation occurs, unstable gap control operation can be suppressed, and therefore stable gap control can be performed with reducing unrelated fluctuation not due to fluctuation of the gap.

A gap control method for an optical information apparatus according to another aspect of the present invention is a gap control method for an optical information apparatus that records and/or reproduces information using an information recording medium, comprising: a first step of detecting output power of a light source that outputs light and generating a power detection signal; a second step of controlling the output power of the light source using the power detection signal; a third step of detecting a gap length between the information recording medium and an optical system which forms a predetermined sized beam spot on the information recording medium using the light from the light source, and generating a gap detection signal; a fourth step of generating a corrected gap detection signal by removing, from the gap detection signal, a fluctuation component which is not less than a gain crossover frequency of the power control in the second step; and a fifth step of controlling the gap length between the information recording medium and the optical system using the corrected gap detection signal.

According to this gap control method, the corrected gap detection signal is generated by removing the fluctuation component, not less than the gain crossover frequency of the power control, from the gap detection signal, and the gap length between the information recording medium and the optical system is controlled using this corrected gap detection signal, therefore fluctuation of the gap can be accurately detected with removing influence of the light quantity fluctuation not due to fluctuation of the gap, and stable gap control can be performed based on this accurately detected fluctuation of the gap. As a result, stable gap control operation is guaranteed without receiving influence of the power fluctuation that cannot be suppressed by the power control, and stable gap control operation can be performed with reducing the fluctuation not due to fluctuation of the gap.

INDUSTRIAL APPLICABILITY

The optical information apparatus according to the present invention can implement stable gap control without receiving influence of the laser power fluctuation, therefore it is useful as an optical information apparatus that records and/or reproduces information using an information recording medium, such as an optical disk apparatus that records and/or reproduces information on/from an optical disk.

The invention claimed is:

1. An optical information apparatus that records and/or reproduces information using an information recording medium, comprising:
a light source that outputs light;
an optical system that forms a predetermined sized beam spot on the information recording medium using the light from the light source;
a power detection unit that detects output power of the light source and generates a power detection signal;
a power control unit that controls the output power of the light source using the power detection signal;
a gap detection unit that detects a gap length between the information recording medium and the optical system, and generates a gap detection signal;
a correction unit that generates a corrected gap detection signal by removing, from the gap detection signal, a fluctuation component which is not due to fluctuation of the gap between the information recording medium and the optical system; and
a gap control unit that controls the gap length between the information recording medium and the optical system using the corrected gap detection signal, wherein
the power control unit has a gain crossover frequency greater than a gain crossover frequency of the gap control unit, and
the correction unit includes:
a filter unit that extracts a fluctuation component of the output power of the light source from the power detection signal; and
a fluctuation component removal unit that generates the corrected gap detection signal by removing, from the gap detection signal, the fluctuation component extracted by the filter unit.

2. The optical information apparatus according to claim 1, wherein
the power control unit has a gain crossover frequency which is not less than 10 times the gain crossover frequency of the gap control unit.

3. The optical information apparatus according to claim 1, further comprising a power supply that supplies power to drive the light source, wherein
the power control unit has a gain crossover frequency that is higher than the frequency of noise from the power supply.

4. An optical information apparatus that records and/or reproduces information using an information recording medium, comprising:
a light source that outputs light;
an optical system that forms a predetermined sized beam spot on the information recording medium using the light from the light source;
a power detection unit that detects output power of the light source and generates a power detection signal;
a power control unit that controls the output power of the light source using the power detection signal;
a gap detection unit that detects a gap length between the information recording medium and the optical system, and generates a gap detection signal;
a correction unit that generates a corrected gap detection signal by removing, from the gap detection signal, a fluctuation component which is not less than a gain crossover frequency of the power control unit; and
a gap control unit that controls the gap length between the information recording medium and the optical system using the corrected gap detection signal, wherein,
the correction unit includes:
a filter unit that extracts a fluctuation component, which is not less than the gain crossover frequency of the power control unit, from the power detection signal; and
a fluctuation component removal unit that generates the corrected gap detection signal by removing, from the gap detection signal, the fluctuation component extracted by the filter unit.

5. A gap control method for an optical information apparatus that records and/or reproduces information using an information recording medium, comprising:
a first step of detecting output power of a light source that outputs light and generating a power detection signal;
a second step of controlling the output power of the light source using the power detection signal;

a third step of detecting a gap length between the information recording medium and an optical system which forms a predetermined sized beam spot on the information recording medium using the light from the light source, and generating a gap detection signal;

a fourth step of generating a corrected gap detection signal by removing, from the gap detection signal, a fluctuation component which is not due to fluctuation of the gap between the information recording medium and the optical system; and a fifth step of controlling the gap length between the information recording medium and the optical system using the corrected gap detection signal, wherein a gain crossover frequency of the power control in the second step is greater than a gain crossover frequency of the gap control in the fifth step, and the fourth step includes:

a sixth step of extracting a fluctuation component of the output power of the light source from the power detection signal; and a seventh step of generating the corrected gap detection signal by removing, from the gap detection signal, the fluctuation component extracted in the sixth step.

6. A gap control method for an optical information apparatus that records and/or reproduces information using an information recording medium, comprising:

a first step of detecting output power of a light source that outputs light and generating a power detection signal;

a second step of controlling the output power of the light source using the power detection signal;

a third step of detecting a gap length between the information recording medium and an optical system which forms a predetermined sized beam spot on the information recording medium using the light from the light source, and generating a gap detection signal;

a fourth step of generating a corrected gap detection signal by removing, from the gap detection signal, a fluctuation component which is not less than a gain crossover frequency of the power control in the second step; and a fifth step of controlling the gap length between the information recording medium and the optical system using the corrected gap detection signal, wherein the fourth step includes:

a sixth step of extracting a fluctuation component, which is not less than the gain crossover frequency of the power control in the second step, from the power detection signal; and a seventh step of generating the corrected gap detection signal by removing, from the gap detection signal, the fluctuation component extracted in the sixth step.

* * * * *